United States Patent [19]
Kano et al.

[11] 3,904,639
[45] Sept. 9, 1975

[54] THIAZOLOTRIAZOLYPHOSPHONOTHIO-ATES

[75] Inventors: Saburo Kano; Osami Nomura, both of Odawara; Mitsuo Asada, Hiratsuka; Meiki Ando; Michihiko Matsuda, both of Kanagawa; Tomio Yamada; Hitoshi Watanabe, both of Hiratsuka; Takuzo Taniguchi, Kamakura, all of Japan

[73] Assignee: Nippon Soda Co., Ltd., Tokyo, Japan

[22] Filed: Dec. 29, 1972

[21] Appl. No.: 319,490

[30] Foreign Application Priority Data
Dec. 30, 1971 Japan.................................. 47-3186

[52] U.S. Cl. .......................... 260/306.7 E; 424/200
[51] Int. Cl.² ....................................... C07D 513/04
[58] Field of Search ................. 260/306.7, 306.7 E; 424/200

[56] References Cited
UNITED STATES PATENTS
3,682,943   8/1972   Hoffmann et al. ............... 260/306.7

OTHER PUBLICATIONS

Brown, Insect Control by Chemicals, N.Y., John Wiley & Sons, 1951, pp. 65–66.

Frear et al., *J. Economic Entomology*, 40(5), 736–741 (1947).

*Primary Examiner*—R. J. Gallagher
*Attorney, Agent, or Firm*—George B. Oujevolk

[57]    ABSTRACT

A compound represented by the formula

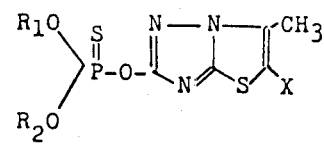

wherein
$R_1$ and $R_2$ are lower alkyl having six or less carbon atoms,
X is bromine.

2 Claims, No Drawings

THIAZOLOTRIAZOLYPHOSPHONOTHIOATES

This invention relates to novel thiazolotriazolylphosphonothioates and to a process for the preparation of the same. Further, the invention relates to insecticidal and acaricidal compositions containing one or more of said novel compounds and further includes methods for combatting insects and mites with these compounds.

A number of organo phosphate insecticides have been used for the control of many injurious insects and certain materials are known to be effective. However, many of these systemic insecticides have a strong toxicity for human and warm-blooded animals. Among harmful insects are phytophagous mites which give great damage to plants and crops. Indeed a crop free from mite damage can scarcely be found. Its damage is very large and considerable money for extermination expense is used annually. Further, some insects and mites having resistance against the currently employed insecticides and acaricides have recently appeared. Therefore, it becomes a matter of importance to control the insects and the mites. Accordingly, development of novel, effective insecticides and acaricides is desired in order to control these insects and mites.

The inventors have discovered that the compounds of this invention have superior insecticidal and acaricidal activities.

The novel compounds of this invention are characterized by the following formula:

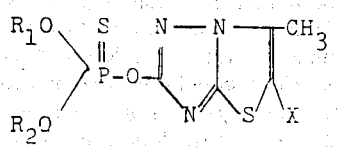

Wherein
$R_1$ and $R_2$ are lower alkyl having six or less carbon atoms,
X is bromine.

It is one object of the present invention to provide new thiazolotriazolylphosphonotioates, which are useful in the control of insects and mites. It is another object of the present invention that the compounds of the invention have sufficient low phyto-toxicity so that they can be used without any injury to living plants and to provide agents having extremely low mamal toxicity.

In the Japanese Pat. Publication No. 30192/1971 is has been shown that O,O-dialkyl-2-thiazolo[3,2-b]-s-triazolylthionophosphates having no substituent at 6 position therein are useful as insecticidal and acaricidal compositions.

But the inventors herein synthesized various thiazolotriazolylphosphonothioates and tested the biological activity thereof, and have discovered that thiazolotriazolylphosphonothioates having at the 6 position a bromine substituent have strong insecticidal and acaricidal activities and furthermore, these compounds have very low mammal toxicity.

For example, acute oral toxicity $LD_{50}$ (mouse) of O,O-diethyl-2-(5-methylthiazolo[3,2-b]-s-triazolyl)thionophosphates of Japanese Pat. Publication No. 30192/1971 is 33–50 mg/kg, but one of O,O-diethyl-2-(5-methyl-6-bromothiazolo[3,2-b]-s-triazolyl)thionophosphate of the present invention is 150 mg/kg, so that it can be said to be comparatively safe.

The compounds of this invention can be prepared in accordance with the following equation:

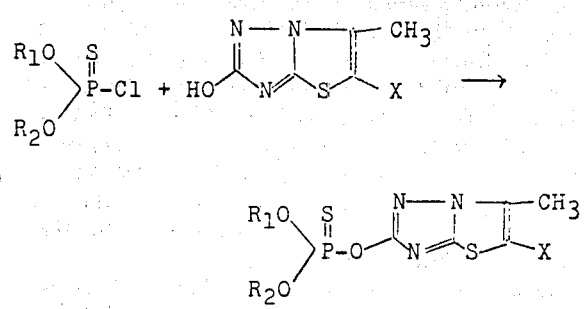

(wherein $R_1$, $R_2$ and X represent the hereinafter described.)

Usually the process of the invention is carried out in a proper inert solvent by the use of alkali condensing agents. As an inert solvent, acetone, dioxane, acetonitrile and pyridine have been employed. Using these inert solvents, the compunds of this invention are obtained in low yield such as 5 to 6%.

However, the inventors have discovered that the compounds of this invention are be obtained in satisfactory high yields such as 50 to 70% when dimethylformamide or dimethylsulfoxide are employed as solvents in the presence of potassium carbonate or sodium carbonate as condensing agents.

In a practical method the compounds of this invention are prepared through the reaction of O,O-dialkylthiophosphorylchloride with 6-halogenothiazolo[3,2-b]-s-triazol using dimethylformamide or dimethylsulfoxide as a solvent in the presence of alkali carbonate as a condensing agent, or with alkali metal salts of 6-halogenothiazolo[3,2-b]-s-triazol which are dissolved in the solvent such as dimethylformamide or dimethylsulfoxide.

Reaction termperature is 40°–60°C, preferably 45°–50°C and the reaction terminates after between 4 and 10 hours.

After the reaction is terminated, the products are isolated from the reaction mixture by employing the following treatment.

The reaction mixture is poured into water after cooling to room temperature, this water mixture is alkalized by adding dilute sodium hydroxide solution and unreacted starting materials are dissolved in the alkali solution. The crystallized material was collected by filtration, washed with water and dried, and the crude product is obtained as a crystal.

The crude product can be purified by recrystallizing from a mixture of ligroin and petroleum ether.

The desired product is obtained as white crystal.

Unreacted starting material can be recovered from the mother liquor and acidified with hydrochloric acid solution.

In order to facilitate a clear understanding or the invention, the following preferred specific embodiments are described as illustrative examples and not as limiting the invention.

EXAMPLE 1

O,O-Dimethyl-2-(5-methyl-6-bromothiazolo[3,2-b]-s-triazolyl)thionophosphate 4.68 g of 2-hydroxy-5-methyl-6-bromothiazolo[3,2-b]-s-triazole, 3 g of potassium carbonate and 3 g of O,O-dimethylthiophosphoryl chloride were dissolved in 100 ml of dimethylformamide and heated at 45°–50°C for 4 hours under agitation. Then the reaction mixture was poured into water and alkalized sodium hydroxide solution to crystallize the reaction product. The crystallized material was gathered by filtration, washed with water and dried. The dried crystal was recrystallized from mixed solvent of ligroin and petroleum ether and 4.1 g of white crystal having a melting point of 100°–102°C were obtained. The crystal consist of O,O-dimethyl-2-(5-methyl-6-bromothiazolo[3,2-b]-s-triazolyl)thionophosphate, and the elemental analysis was as follows:

Found (%); C, 23.41; H, 2.55; N, 11.95; S, 17.64. Calcd. for $C_7H_9BrN_3O_3PS_2$ (%); C, 23.47; H, 2.53; N, 11.73; S, 17.90.

EXAMPLE 2

O,O-Diethyl-2-(5-methyl-6-bromothiozolo[3,2-b]-s-triazolyl)thionophosphate 4.86 g of 2-hydroxy-5-methyl-6-bromothiazolo[3,2-b]-s-triazole, 3 g of potassium carbonate and 3.4 g of O,O-diethylthiophosphoryl chloride were dissolved in 100 ml of dimethylformamide and heated at 45°–50°C for 4 hours under agitation.

By a procedure similar to Example 1, 5 g of O,O-diethyl-2-(5-methyl-6-bromothiazolo[3,2-b]-s-triazolyl)thionophosphate having a melting point of 102°–103°C were obtained.

Elemental analysis was as follows:

Found (%); C, 27.83; H, 3.47; N, 11.11; S, 16.22. Calcd. for $C_9H_{13}BrN_3O_3PS_2$ (%); C, 27.99; H, 3.39; N, 10.88; S, 16.60.

EXAMPLE 3

O,O-Dimethyl-2-(5-methyl-6-chlorothiazolo[3,2-b]-s-triazolyl)thionophosphate 3.79 g of 2-hydroxy-5-methyl-6-chlorothiazolo[3,2-b]-s-triazole, 3 g of potassium carbonate and 3 g of O,O-dimethylthiophosphoryl chloride were dissolved in 100 ml of dimethylformamide and heated at 45°–50°C for 4 hours under agitation.

By a procedure similar to Example 1, 3.4 g of O,O-dimethyl-2-(5-methyl-6-chlorothiazolo[3,2-b]-s-triazolyl)thionophosphate having a melting point of 73°–75°C were obtained.

Elemental analysis was as follows: Found (%); C, 26.71; H, 2.94; N, 13.67; S, 20.34. Calcd. for $C_7H_9ClN_3O_3PS_2$ (%); C, 26.80; H, 2.89; N, 13.39; S, 20.44.

EXAMPLE 4

O,O-Diethyl-2-(5-methyl-6-chlorothiazolo[3,2-b]-s-triaxolyl)thionophosphate 3.79 g of 2-hydroxy-5-methyl-6-chlorothiazolo[3,2-b]-s-triazole, 3 g of potassium carbonate and O,O-diethylthiophosphoryl chloride were dissolved in 100 ml of dimethylformamide and heated at 45°–50°C for 4 hours under agitation.

By a procedure similar to Example 1, 4.5 g of O,O-diethyl-2-(5-methyl-6-chlorothiazolo[3,2-b]-s-triazolyl)thionophosphate having a melting point of 80°–82°C were obtained.

Elemental analysis was as follows: Found (%); C, 31.54; H, 3.78; N, 12.76; S, 18.54. Calcd. for $C_9H_{13}ClN_3O_3PS_2$ (%); C, 31.63; H, 3.83; N, 12.30; S, 18.76.

In addition to the above mentioned compound described in the preceding examples, some typical compounds of the present invention are listed in Table I.

Table I

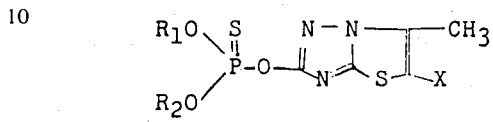

| Compound No. | $R_1$ | $R_2$ | X | m.p. (°C) |
| --- | --- | --- | --- | --- |
| I | $CH_3$ | $CH_3$ | Br | 100 – 102 |
| II | $C_2H_5$ | $C_2H_5$ | Br | 102 – 103 |
| III | $CH_3$ | $CH_3$ | Cl | 73 – 75 |
| IV | $C_2H_5$ | $C_2H_5$ | Cl | 80 – 82 |
| V | $CH_3$ | $C_2H_5$ | Br | 93 – 95 |

Hereinafter, the compounds of this invention are represented by Compound No. in Table 1.

The method of the present invention comprehends the employment of a liquid or solid composition containing one or more of the present compounds as an active component.

The compound can be used directly without mixing with suitable carriers.

The active ingredient of this invention may be formulated by mixing with suitable carriers in a form generally used in pesticidal composition such as wettable powder, emulsifiable concentrate, dust formulation, granular formulation, water soluble powder and aerosol. As solid carriers, bentonite, diatomaceous earth, apatite, gypsum, talc, pyrophyllite, vermiculite, clay and others are used. As liquid carriers, kerosene, mineral oil, petroleum, solvent maphtha, xylene, cyclohexane, cyclohexanone, dimethylformamide, dimethylsulfoxide, alcohol, acetone, benzene and others are used. Sometimes surface active agent is added in order to give a homogeneous and stable formulation.

Furthermore, the composition may be applied as a mixture with other fungicides, insecticides, acaricides, plant growth regulators and fertilizers.

The concentrations of the active ingredients in the insecticidal and acaricidal compositions of this invention vary according to type of formulation, and they are, for example, used in a range of 5–80 weight percent, preferably 20–80 weight percent, in wettable powders, 5–70 weight percent, preferably 10–50 weight percent, in emulsifiable concentrates, and 0.5 –20 weight percent, preferably 1–10 weight percent in dust formulations.

The non-limiting examples for the insecticidal and acaricidal compositions are illustrated as follows:

EXAMPLE 5

Wettable Powder

| | Parts by weight |
| --- | --- |
| Compound I | 40 |
| Higher alcohol sulfonate ester | 5 |
| Diatomaceous earth | 51 |
| White carbon | 4 |

These are mixed homogeneously and micronized to fine particles. Consequently, wettable powder containing 40 % of active ingredient is obtained. In practical use, it is diluted to a certain concentration with water and is sprayed as a suspension.

EXAMPLE 6

Emulsifiable Concentrate

| | Parts by weight |
|---|---|
| Compound II | 30 |
| xylene | 40 |
| dimethylformamide | 22 |
| polyoxyethylene alkylarylether | 8 |

These are mixed and dissolved.

Consequently, emulsifiable concentrate containing 30% of the active ingredient is obtained. In practical use, it is diluted to certain concentration with water and then is sprayed as an emulsion.

EXAMPLE 7

Dust Formulation

| | Parts by weight |
|---|---|
| Compound III | 3 |
| Talc | 97 |

These are mixed homogeneously and micronized to fine particles. Consequently, dust formulation containing 3% of the active ingredient is obtained. In practical use it is directly applied.

In the Example 5–7, it is not intended to limit the emulsifying, wetting or dispersing agents, carriers and solvents to the ones described by way of illustration.

The compounds listed in Table 1 possess a very superior insecticidal and acaricidal activities compared to known compounds.

The superior insecticidal and acarcidal effects of the novel compounds of this invention are clearly illustrated by the following tests.

In these all tests, O,O-dimethyl-2-(5-methylthiazolo[3.2-b]-s-triazolyl)thionophosphate of the Japanese Pat. Publication No. 30192/1971 is compared with the compounds of this invention.

Test 1 Insecticidal Activity against Fly

Fixed concentration of acetone solution containing test compound were prepared.

20 house flies (*Musca domestica* Linné) were tested with 1 μl of acetone solution at their thoracic dorsal by microsyringe and kept at a temperature of 25°C and at a humidity of 65%. 24 hours and 48 hours after treatment, dead flies were counted and mortality (%) was calculated. The results were shown in Table 2.

Table 2

| Test Compound | Active compound 1$^2$/1 fly | | Active compound 0.5$^2$/1 fly | |
|---|---|---|---|---|
| | 24 hrs. | 48 hrs. | 24 hrs. | 48 hrs. |
| I | 100 | 100 | 95 | 100 |
| II | 100 | 100 | 90 | 100 |
| III | 100 | 100 | 90 | 95 |
| IV | 100 | 100 | 90 | 100 |
| V | 100 | 100 | 90 | 100 |
| Contrast* | 100 | 100 | 70 | 70 |

*Contrast: O,O-dimethyl-2-(5-methylthiazolo[3.2-b]-s-triazolyl) thionophosphate

Test 2 Insecticidal Activity against Cockroach

Acetone solution of test compound were dropped on filter paper having a diameter of 9cm in order that active compound on filter paper became 125 and 31.3mg/m$^2$. The filter paper was airdried and setted in schale, and in which 10 hatched nymph (American cockroach, *Periplaneta americana* Linné) were inoculated.

24 hours and 72 hours after inoculation, dead insects were counted and mortality (%) was calculated.

The results were shown in Table 3.

Table 3

| Test Compound | Active compound 125 mg/m$^2$ | | Active compound 31.3 mg/m$^2$ | |
|---|---|---|---|---|
| | 24 hrs. | 72 hrs. | 24 hrs. | 72 hrs. |
| I | 100 | 100 | 30 | 100 |
| II | 100 | 100 | 100 | 100 |
| III | 100 | 100 | 40 | 100 |
| IV | 100 | 100 | 100 | 100 |
| V | 100 | 100 | 100 | |
| Contrast* | 100 | 100 | 0 | 30 |

Test 3 Insecticidal Activity against Mosquito

An aqueous suspension of wettable powder formulated in similar manner to Example 5 were poured in 200 ml beaker and in which 20 Japanese celler mosquito (*Culex pipiens pallens* Coqvii Maskell) were inoculated. 24 hours and 48 hours after inoculation, dead mosquitos were counted and mortality (%) were calculated.

The results were shown in Table 4.

Table 4

| Conc. of Active Ingredient (ppm) | Test Compound No. II | | Contrast* | |
|---|---|---|---|---|
| | 24 hrs. | 48 hrs. | 24 hrs. | 48 hrs. |
| 0.0833 | | | 100 | 100 |
| 0.0417 | | | 10 | 100 |
| 0.0209 | | | 0 | 30 |
| 0.0105 | | | 0 | 0 |
| 0.0083 | | | | |
| 0.0067 | 100 | 100 | | |
| 0.0042 | 100 | 100 | | |
| 0.0021 | 95 | 100 | | |
| 0.0011 | 15 | 90 | | |

Test 4 Insecticidal Activity against Aphid

A potted chrysanthemum which Chrysanthemum aphid (*Macrosiphoniella sanborni* Gillette) infestation and a potted apple which Woolly apple aphid (*Eriosoma lanigerum* Hausmann) infestation were used.

An aqueous suspension of wettable powder formulated in similar manner to Example 5 were sprayed. After fixed a number of days from spraying, the state of the Aphid was observed. and estimated according to following grading.

| − | : | no effect |
|---|---|---|
| + | : | weak effect |
| ++ | : | considerable effect |
| +++ | : | nearly perfect effect |

The results were shown in Table 5.

Table 5

| Test Compound | Chrysanthemum aphid (Conc. of Active Ingredient 100 ppm) | | Woolly apple aphid (Conc. of Active Ingredient 500 ppm) | |
|---|---|---|---|---|
| | 7 days | 10 days | 7 days | 10 days |
| I | +++ | +++ | +++ | +++ |
| II | +++ | +++ | +++ | +++ |
| III | +++ | +++ | +++ | +++ |
| IV | +++ | +++ | +++ | +++ |
| V | +++ | +++ | +++ | +++ |

Table 5-continued

| Test Compound | Chrysanthemum aphid (Conc. of Active Ingredient 100 ppm) | | Woolly apple aphid (Conc. of Active Ingredient 500 ppm) | |
|---|---|---|---|---|
| | 7 days | 10 days | 7 days | 10 days |
| Contrast* | +++ | +++ | ++ | +++ |

Test 5 Insecticidal Activity against Cabbage armyworm

Multigeneration breeded armyworms (*Leucania separata* Walker) were used for this test.

A leaf of corn plant was dipped in an aqueous emulsion of emulsifiable concentrate formulated in similar manner to Example 6 for 30 seconds and air dried.

Then the leaf was placed on filter paper having 9 cm diameter on a scale. The test insects were inoculated into the scale and the scale was put on the cover. After 1 day and 3 days from inoculation, dead insects were counted and mortality (%) were calculated. The results were shown in Table 6.

Test 6 Test for Control of Mite

About 30 adult female nites of desert spider mite (*Tetranychus desertorum* Banks) laid on main leaves of the potted kidney bean plants grown 7 to 10 days stage after sprouting. One day later, the wounded mites were removed from the plants. The compounds to be tested were sprayed on the plants as water suspension of emulsifiable concentrate prepared by the method of Example 6. After 1 day and 3 days from spraying, dead mites was counted and mortality (%) was calculated.

Rating of mortality was recorded as follows:

| Mortality | Rating |
|---|---|
| 100 % | +++ |
| 99 – 90 % | ++ |
| 89 – 50 % | + |
| 50 – 0 % | – |

The results are shown in Table 7.

Table 7

| Test Compound | Concentration of Active Ingredient | | | | | |
|---|---|---|---|---|---|---|
| | 125 ppm | | 31.3 ppm | | 7.81 ppm | |
| | 1 day | 3 days | 1 day | 3 days | 1 day | 3 days |
| I | +++ | | +++ | | +++ | |
| II | +++ | | +++ | | +++ | |
| III | +++ | | +++ | | +++ | |
| IV | +++ | | +++ | | +++ | |
| V | +++ | | +++ | | +++ | |
| Contrast* | +++ | | +++ | | ++ | +++ |

We claim:

1. A compound represented by the formula:

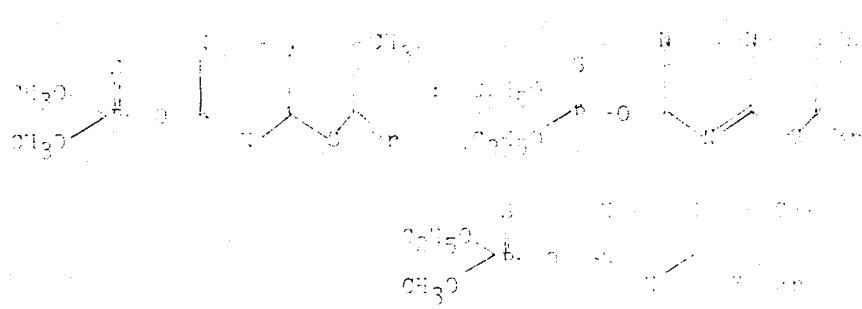

wherein $R_1$ and $R_2$ are each selected from the group consisting of methyl and ethyl.

Table 6

| Test Compound | Concentration 62.5 ppm | | Concentration 31.3 ppm | | Concentration 15.7 ppm | | Concentration 7.8 ppm | |
|---|---|---|---|---|---|---|---|---|
| | 1 day | 3 days | 1 day | 3 days | 1 day | 3 days | 1 day | 3 days |
| I | 100 | 100 | 100 | 100 | 90 | 100 | 60 | 100 |
| II | 100 | 100 | 100 | 100 | 100 | 100 | 80 | 90 |
| III | 100 | 100 | 100 | 100 | 80 | 100 | 50 | 90 |
| IV | 100 | 100 | 90 | 100 | 80 | 100 | 50 | 90 |
| V | 100 | 100 | 100 | 100 | 90 | 100 | 70 | 100 |
| Contrast* | 90 | 100 | 70 | 100 | 30 | 80 | 0 | 0 |

2. A compound selected from the group consisting of

* * * * *

UNITED STATES PATENT OFFICE
CERTIFICATE OF CORRECTION

Patent No. 3,904,639            Dated September 9, 1975

Inventor(s) Saburo Kano, Osami Momura, et al

It is certified that error appears in the above-identified patent and that said Letters Patent are hereby corrected as shown below:

In Table 2, "Active compound $1^2$/1 fly" should be --Active compound $1^\gamma$/1 fly--

In Table 2, "Active compound $0.5^2$/1 fly" should be

--Active compound $0.5^\gamma$/1 fly--

The formula in Claim 1, should appear as set forth below:

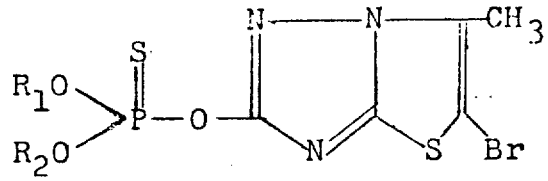

The formulas in Claim 2, should appear as set forth below:

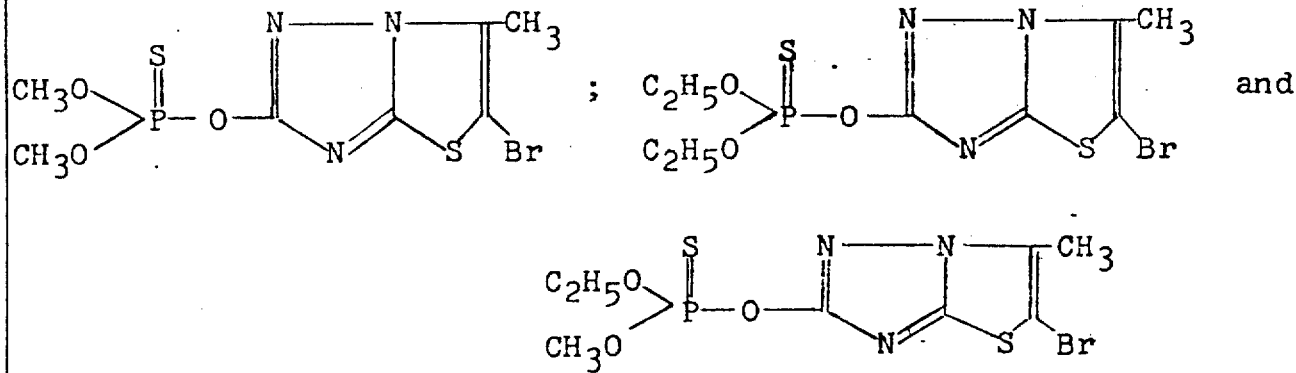

Signed and Sealed this sixteenth Day of March 1976

[SEAL]

Attest:

RUTH C. MASON
*Attesting Officer*

C. MARSHALL DANN
*Commissioner of Patents and Trademarks*